United States Patent
Baker

[11] 3,892,449
[45] July 1, 1975

[54] BEARING RING WITH SHAFT LOCKING MEANS

[75] Inventor: Peter J. Baker, Huron, Ohio

[73] Assignee: General Motors Corporation, Detroit, Mich.

[22] Filed: Oct. 26, 1973

[21] Appl. No.: 410,034

[52] U.S. Cl............ 308/236; 308/189 R; 403/345
[51] Int. Cl. ............................................ F16c 33/30
[58] Field of Search........ 308/236, 207, 189 R, 197; 403/345

[56] References Cited
UNITED STATES PATENTS

| | | |
|---|---|---|
| 1,928,114 | 9/1933 | Scheffler............................ 308/236 |
| 2,650,867 | 9/1953 | Spieth............................... 308/236 |
| 3,709,575 | 1/1973 | Howe, Jr............................ 308/236 |
| 3,825,312 | 1/1974 | Allaben, Jr........................ 308/236 |

Primary Examiner—M. Henson Wood, Jr.
Assistant Examiner—Richard A. Bertsch
Attorney, Agent, or Firm—F. J. Fodale

[57] ABSTRACT

A ball bearing includes two tapered split sleeves having cooperating helical faces carried in the bore of the inner race ring in a unit-handled relationship. Relative rotation of the sleeves wedges the sleeves between a shaft received in the sleeves and interior conical surfaces of the inner race ring thereby securing the ball bearing to the shaft.

8 Claims, 4 Drawing Figures

BEARING RING WITH SHAFT LOCKING MEANS

This invention relates generally to bearing rings or the like with shaft locking means.

It is already known to provide antifriction bearing rings with shaft locking means comprising a single tapered split sleeve which is wedged between a conical internal surface of the inner race ring and a shaft to secure the bearing to the shaft. The wedging action is effected by axial displacement of the sleeve with respect to the inner race ring which may be accomplished by nuts threaded on the inner race ring, set screws carried by the inner race ring, or eccentric cam surfaces in the inner race ring bore as shown respectively in U.S. Pat No. 738,445 issued to Ernest G. Hoffmann on Sept. 8, 1903 for a "Device for Securing Parts to Shafts"; U.S. Pat No. 2,118,891 issued to Salvatore F. Marino on May 31, 1938 for an "Antifriction Bearing"; and U.S. Pat. No. 3,709,575 issued to Ralph S. Howe, Jr. on Jan. 9, 1973 for a "Shaft Locking Device".

As far as I am aware in these and all other prior art devices using a tapered split sleeve, only a single split, tapered sleeve is used with the result that an unduly complicated and expensive structure is required to axially displace the tapered split sleeve.

The object of my invention is to provide a bearing ring or the like with a shaft locking device which simply consists of two tapered split sleeves which impart the required axial displacement to each other for wedging the sleeves between the bore of the bearing race ring and a shaft.

Another object of my invention is to provide a bearing ring or the like with a shaft locking device which simply consists of two tapered split sleeves rotatably carried in the bore of the bearing ring in an end-to-end relationship which secure the bearing ring to a shaft responsive to a simple relative rotation between the sleeves.

Yet another object of my invention is to provide a bearing ring or the like with a shaft locking means simply consisting of two tapered split sleeves rotatably retained in a generally concave, bi-conical bore of the bearing ring.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
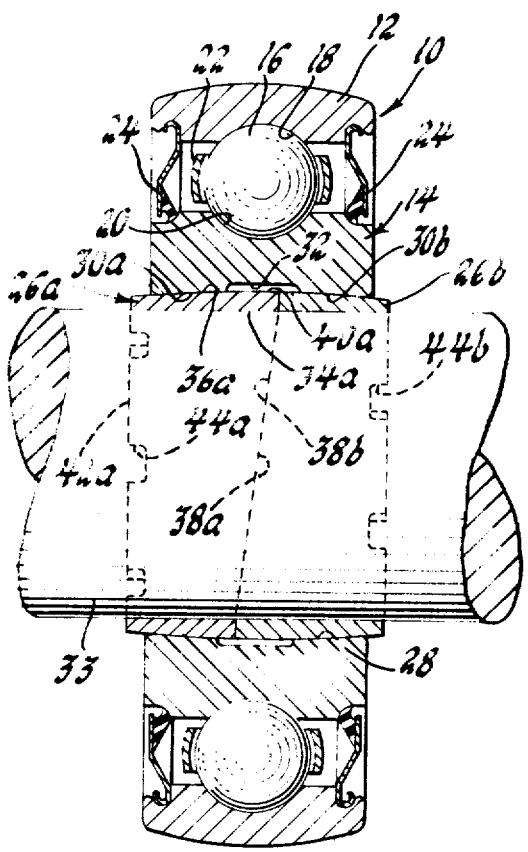
FIG. 1 is an axial section of an antifriction bearing having an inner race ring with a shaft locking means in accordance with my invention.

Referring now to the drawings and more particularly to FIG. 1, the antifriction bearing 10 comprises an outer race ring 12 and an inner race ring 14 concentrically spaced by a complement of bearing balls 16 which run in the full groove raceways 18 and 20. The bearing balls 16 are circumferentially spaced by a separator 22 and the annular space between the outer race 12 and the inner race ring 14 may be closed at the ends by seals 24.

Figure 2:
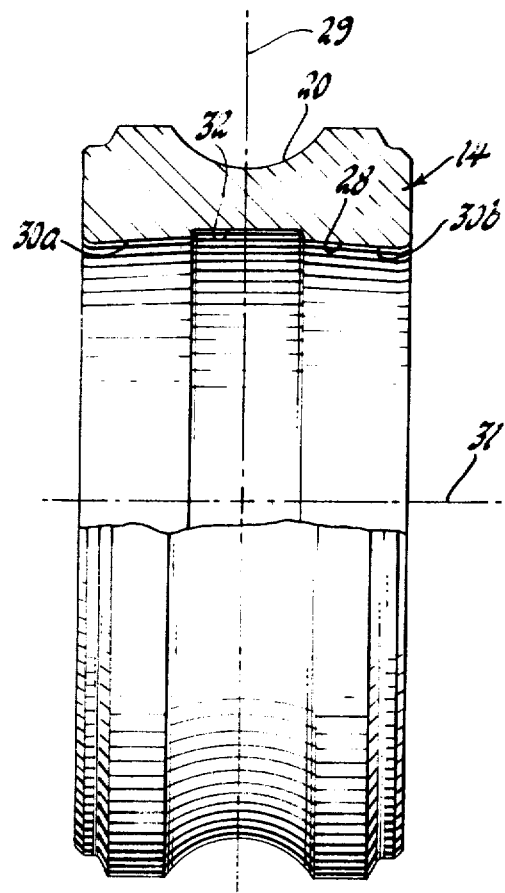
FIG. 2 is an enlargement of the inner race ring shown in FIG. 1.

The inner race ring 14 has shaft locking means which consists of two tapered split sleeves 26a and 26b rotatably carried in a generally concave, bi-conical bore 28 of the inner race ring 14. As illustrated in FIG. 2, the bore 28 is symmetrical to the center plane 29 which is perpendicular to the longitudinal axis 31 of the inner race ring 14 and intersects the lowest point of the symmetrical raceway 20. The bore 28 has equal and oppositely inclined conical portions 30a and 30b which may be separated by a central groove 32. The angle which each of the conical portions 30a and 30b makes with respect to the axis of the inner race ring 14 is on the order of a few degrees.

Figure 3:
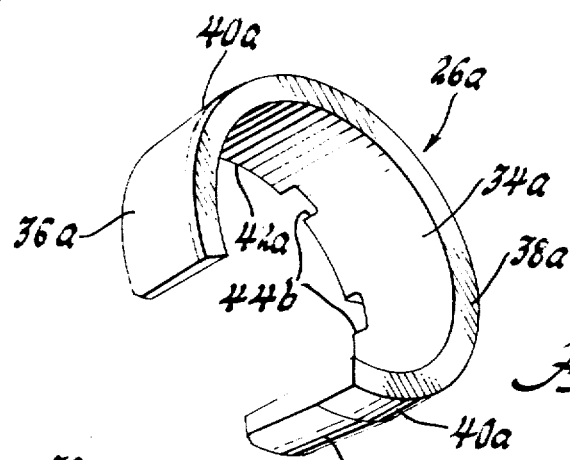
FIG. 3 is a perspective view of one of the tapered split sleeves shown in FIG. 1.
Figure 4:
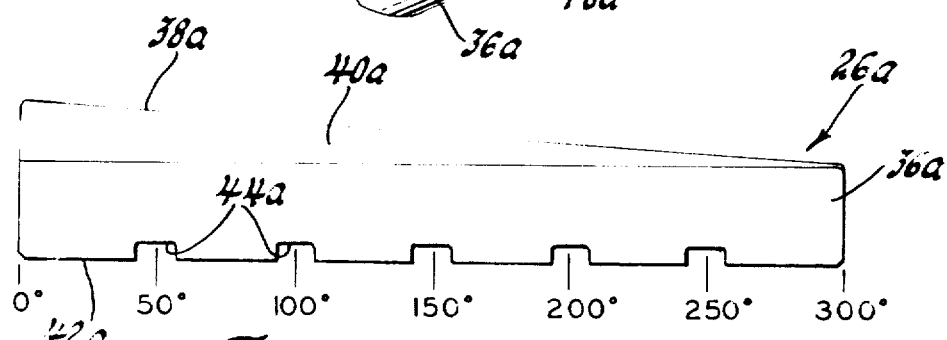
FIG. 4 is a developed view of the tapered split sleeve shown in FIG. 3.

The tapered split sleeves 26a and 26b are preferably identical. The typical split sleeve 26a as best shown in FIG. 3 extends circumferentially approximately 300° leaving a relatively wide split. The inner surface 34a of the tapered split sleeve 26a is parti-cylindrical for conforming engagement with a shaft. The major portion 36a of the outer surface of the split sleeve 26a is at the same angle which the conical portions 30a and 30b make with the axis of the inner race ring 14 and the larger end of the tapered split sleeve has a helical end face 38a. Preferably a portion 40a of the outer surface at the larger end of the split sleeve 26a is parti-cylindrical to eliminate a sharp edge at the juncture of the outer surface with the helical end face 38a.

The end face 42a at the smaller end of the sleeve may be provided with a number of slots 44b for reception of a spanner tool (not shown) used for rotating the split sleeve relative to the inner race ring 14.

The split ring 26a is assembled to the inner race ring 14 by squeezing the split ring 26a and inserting the end 38a into the left end of the bore 23 as viewed in FIG. 1. Upon release, the split ring is held in assembly with the inner race ring 14 by the engagement of the surface 36a with the conical surface 30a of the bore.

The tapered split ring 26b is identical to the split ring 26a. The corresponding parts of the tapered split rings 26a and 26b are identified with the same numerals which are combined with letter designations a and b respectively. The split ring 26b is assembled to the inner race ring 14 by squeezing it and inserting the end 38b into the right end of the bore 28. When both split rings are properly assembled within the bore 28 of the inner race ring 14, their respective helical faces 38a and 38b engage and the tapered split rings are under a slight compression.

The inner race ring 14 (and consequently the ball bearing 10) is secured to a shaft 33 simply by disposing the shaft within the aligned split rings 26a and 26b and rotating one of the spllit rings relative to the other one in a direction which moves the slotted ends of the split rings further apart. This may conveniently be done with two spanner tools (not shown) in conjunction with the slots 44a and 44b. From an inspection of FIG. 1, it can be seen that as the tapered split rings move in this fashion, they are wedged between the shaft 33 and the conical surfaces 30a and 30b respectively. When the conical surfaces 30a and 30b are symmetrical as shown in the drawings, symmetrical deflections are imparted to the inner race ring 14. When the shaft locking means is used in conjunction with a ball bearing, it is advantageous to use symmetrical conical surfaces as the symmetrical deflections tend to produce a smaller raceway curvature and a more favorable stress pattern than in shaft locking means which impart unsymmetrical deflections to the inner race ring since this tends to increase the load on one side of the raceway. Furthermore, it should be noted the shaft locking means consists simply of two tapered split sleeves which may advantageously be of identical configurations and an easily configured inner race ring bore having two conical surfaces concentric to the axis of the bearing.

Although the ball bearing 10 with the shaft locking means according to my invention is illustrated as having two identical tapered split sleeves, this feature need not necessarily be utilized. For instance, it may be desirable to eliminate any projections at one end of the inner race ring 14. In such an instance, one of the sleeves 26a or 26b could be shortened and disposed completely within the bore of the inner race ring 14. Even if the shortened sleeve becomes totally inaccessible, the shaft locking device may still be activated simply by appllying an axial load to the inner race ring to firmly seat the inaccessible sleeve and rotating the other sleeve which is accessible. Also in some instances, it may be desirable to have an inner bearing ring with two conical surfaces which are not symmetrical to the center plane 29 either because of location or angle. In other words, although a specific embodiment of my invention has been illustrated and described in great detail, it should be apparent that certain modifications, changes and adaptations may be made which come within the spirit of the present invention.

What is claimed is:

1. A bearing race ring or the like with shaft locking means comprising,
   a ring having a generally concave bore which includes a first conical portion and a second conical portion, said first and second conical portions being inclined in opposite direction toward each other,
   a first split ring having a tapered outer surface and a helical end face, said first split ring being disposed in said bore with its tapered outer surface engaging said first conical portion of said bore, and
   a second split ring having a tapered outer surface and a helical end face, said second split ring being disposed in said bore with said tapered outer surface engaging said second tapered conical portion of said bore and said helical end face engaging said helical end face of said first split ring whereby said first and second split rings are displaceable axially with respect to said ring responsive to relative rotation between said split rings.

2. The combination as defined in claim 1 wherein at least one of said split rings has a portion protruding from said ring, said protruding portion having an end face provided with slots for receiving a spanner tool.

3. The combination as defined in claim 2 wherein said split rings are identical.

4. An antifriction bearing with shaft locking means comprising,
   an inner bearing race ring having a generally concave bore which includes a first concentric conical portion and a second concentric conical portion, said first and second conical portions being inclined in opposite directions and diverging in a direction toward each other, and
   a first tapered split ring and a second tapered split ring rotatably carried in said bore in an end-to-end relationship, each of said split rings having a tapered outer surface and a helical end face at its larger end, a major portion of said helical end faces mutually engaging and axially displacing said split rings in opposite directions relative to said inner race and into biasing engagement with said first and second conical portions respectively responsive to relative rotation between said split rings.

5. The combination as defined in claim 4 wherein said first and second conical portions are at equal angles with respect to a longitudinal axis of said inner bearing race.

6. The combination as defined in claim 5 wherein said split rings are identical and each has a portion protruding from said inner race ring, said protruding portions having faces provided with slots for receiving the spanner tool.

7. The combination as defined in claim 5 wherein said inner bearing ring has a ball groove in its outer surface and a bore which is symmetrical to a plane which is perpendicular to said longitudinal axis and intersects said ball groove at its lowest point.

8. The combination as defined in claim 7 wherein said split rings are identical and each has a portion protruding from said inner race ring, said protruding portions having faces provided with slots for receiving a spanner tool.

* * * * *

UNITED STATES PATENT OFFICE
CERTIFICATE OF CORRECTION

Patent No. 3,892,449  Dated July 1, 1975

Inventor(s) Peter J. Baker

It is certified that error appears in the above-identified patent and that said Letters Patent are hereby corrected as shown below:

Column 2, Line 38, "23" should read --28--
Column 3, Line 22, "appllying" should read --applying--
Column 3, Line 39, "direction toward" should read --directions and diverging in a direction toward--

Signed and Sealed this seventh Day of October 1975

[SEAL]

Attest:

RUTH C. MASON
*Attesting Officer*

C. MARSHALL DANN
*Commissioner of Patents and Trademarks*